(12) United States Patent
Sloan

(10) Patent No.: US 11,160,206 B2
(45) Date of Patent: Nov. 2, 2021

(54) CROP MOWING IMPLEMENT AND A CONVERGING DRUM THEREFOR

(71) Applicant: DEERE & COMPANY, Moline, IL (US)

(72) Inventor: Charles S. Sloan, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 251 days.

(21) Appl. No.: 16/427,583

(22) Filed: May 31, 2019

(65) Prior Publication Data
US 2020/0375101 A1    Dec. 3, 2020

(51) Int. Cl.
| | | |
|---|---|---|
| *A01D 34/66* | (2006.01) | |
| *A01D 43/10* | (2006.01) | |
| *A01D 57/30* | (2006.01) | |

(52) U.S. Cl.
CPC ......... *A01D 34/668* (2013.01); *A01D 34/665* (2013.01); *A01D 43/10* (2013.01); *A01D 34/66* (2013.01); *A01D 34/664* (2013.01); *A01D 34/667* (2013.01); *A01D 57/30* (2013.01)

(58) Field of Classification Search
CPC .... A01D 34/668; A01D 34/665; A01D 43/10; A01D 34/667; A01D 34/664; A01D 57/30; A01D 34/66; A01D 61/004
See application file for complete search history.

(56) References Cited

U.S. PATENT DOCUMENTS

| | | | | |
|---|---|---|---|---|
| 4,166,350 A | * | 9/1979 | Werner | ................ A01D 34/664 56/13.6 |
| 4,214,425 A | * | 7/1980 | Schmitt | .................. A01D 41/04 56/228 |
| 4,448,014 A | * | 5/1984 | Klinner | .................. A01D 34/66 56/13.6 |
| 4,502,267 A | * | 3/1985 | Klinner | .................. A01D 34/66 56/13.6 |

(Continued)

FOREIGN PATENT DOCUMENTS

| | | |
|---|---|---|
| DE | 1482840 A1 | 1/1970 |
| DE | 1803807 A1 | 5/1970 |

(Continued)

OTHER PUBLICATIONS

European Search Report issued in counterpart application No. 20176562.5 dated Oct. 22, 2020 (07 pages).

*Primary Examiner* — Arpad Fabian-Kovacs

(57) ABSTRACT

A converging drum for a crop mowing implement includes a body that extends along a central longitudinal axis. The body rotates about the central longitudinal axis in a defined rotational direction. At least one ramp feature extends radially outward from the body, relative to the central longitudinal axis. The ramp feature is arranged to form an acute angle relative to a reference plane. The acute angle may open toward the defined rotational direction to move cut crop downward, or the acute angle may open away from the defined rotational direction to move crop upward, to position the cut crop for a conditioning system. The converging drum (Continued)

may include a first group of ramp features near a second end of the body for moving cut crop downward, and/or a second group of ramp features near a first end of the body for moving cut crop upward.

13 Claims, 5 Drawing Sheets

(56) References Cited

U.S. PATENT DOCUMENTS

| | | | | |
|---|---|---|---|---|
| 4,787,196 A * | 11/1988 | Voler | ................... | A01D 34/664 |
| | | | | 56/12.8 |
| 4,809,488 A * | 3/1989 | Neuerburg | ............. | A01D 34/66 |
| | | | | 56/13.6 |
| 5,404,695 A * | 4/1995 | Gemelli | ............... | A01D 34/661 |
| | | | | 56/13.6 |
| 5,768,865 A * | 6/1998 | Rosenbalm | .......... | A01D 34/667 |
| | | | | 56/13.6 |
| 5,852,921 A * | 12/1998 | Neuerburg | ............. | A01D 57/30 |
| | | | | 56/6 |
| 6,318,055 B1 * | 11/2001 | Bird | ....................... | A01D 43/10 |
| | | | | 56/6 |
| 6,640,527 B2 * | 11/2003 | Farley | ................... | A01D 61/008 |
| | | | | 56/12.4 |
| 6,718,743 B2 | 4/2004 | Rosenbalm et al. | | |
| 7,165,381 B2 | 1/2007 | Rosenbalm et al. | | |
| 7,461,498 B1 * | 12/2008 | Barnett | ................ | A01D 57/30 |
| | | | | 56/192 |
| 7,669,391 B2 | 3/2010 | Eubanks et al. | | |
| 7,669,396 B2 * | 3/2010 | Eagles | ................. | A01D 61/002 |
| | | | | 56/153 |
| 7,937,921 B2 * | 5/2011 | Lohrentz | ............. | A01D 61/004 |
| | | | | 56/294 |
| 8,006,469 B2 * | 8/2011 | Barnett | ................. | A01D 34/668 |
| | | | | 56/6 |
| 8,020,364 B2 * | 9/2011 | Walch | .................... | A01D 75/20 |
| | | | | 56/320.1 |
| 8,091,328 B2 * | 1/2012 | Teetaert | ............... | A01D 43/08 |
| | | | | 56/13.6 |
| 8,117,810 B1 * | 2/2012 | Hall | ..................... | A01D 43/082 |
| | | | | 56/157 |
| 8,117,811 B1 * | 2/2012 | Hall | ....................... | A01D 43/08 |
| | | | | 56/157 |
| 8,434,290 B2 * | 5/2013 | Barnett | ................. | A01D 34/668 |
| | | | | 56/6 |
| 8,800,254 B2 * | 8/2014 | Stephenson | ............ | A01D 43/10 |
| | | | | 56/192 |
| 9,485,913 B2 | 11/2016 | Rosenbalm et al. | | |
| 9,538,708 B2 * | 1/2017 | Mossman | .............. | A01D 47/00 |
| 9,820,434 B2 * | 11/2017 | McCrea | ................ | A01D 34/14 |
| 10,448,572 B2 * | 10/2019 | Sorensen | ............ | A01D 61/004 |
| 10,477,770 B2 * | 11/2019 | Modak | ................. | A01D 41/142 |
| 2008/0066439 A1 * | 3/2008 | Barnett | ................... | A01D 43/10 |
| | | | | 56/7 |
| 2008/0066441 A1 * | 3/2008 | Barnett | ................. | A01D 43/10 |
| | | | | 56/14.7 |
| 2015/0230405 A1 | 8/2015 | Rosenbalm et al. | | |

FOREIGN PATENT DOCUMENTS

| | | |
|---|---|---|
| DE | 3415131 A1 | 10/1985 |
| DE | 4401500 C1 | 1/1995 |
| EP | 0057936 A2 | 8/1982 |

* cited by examiner

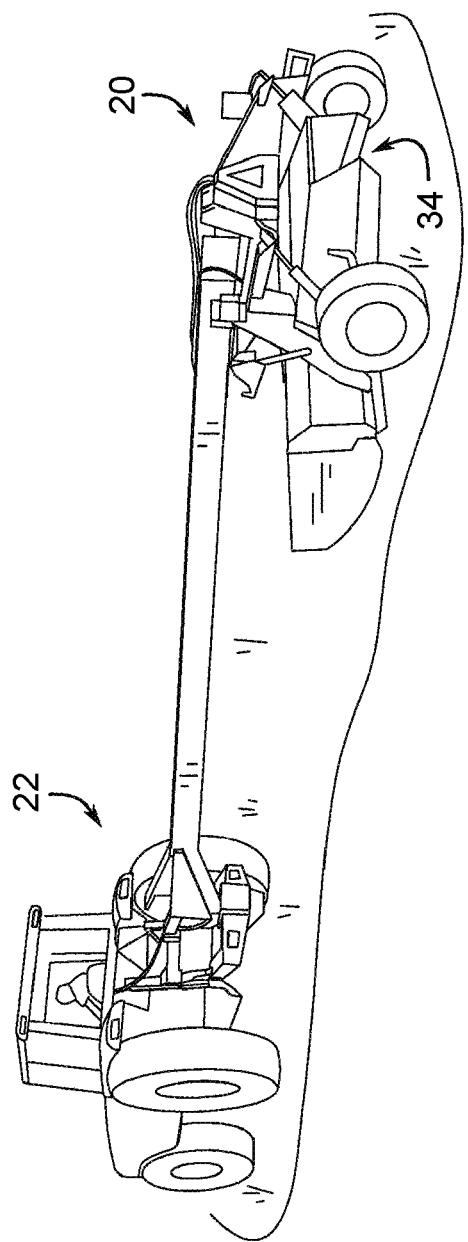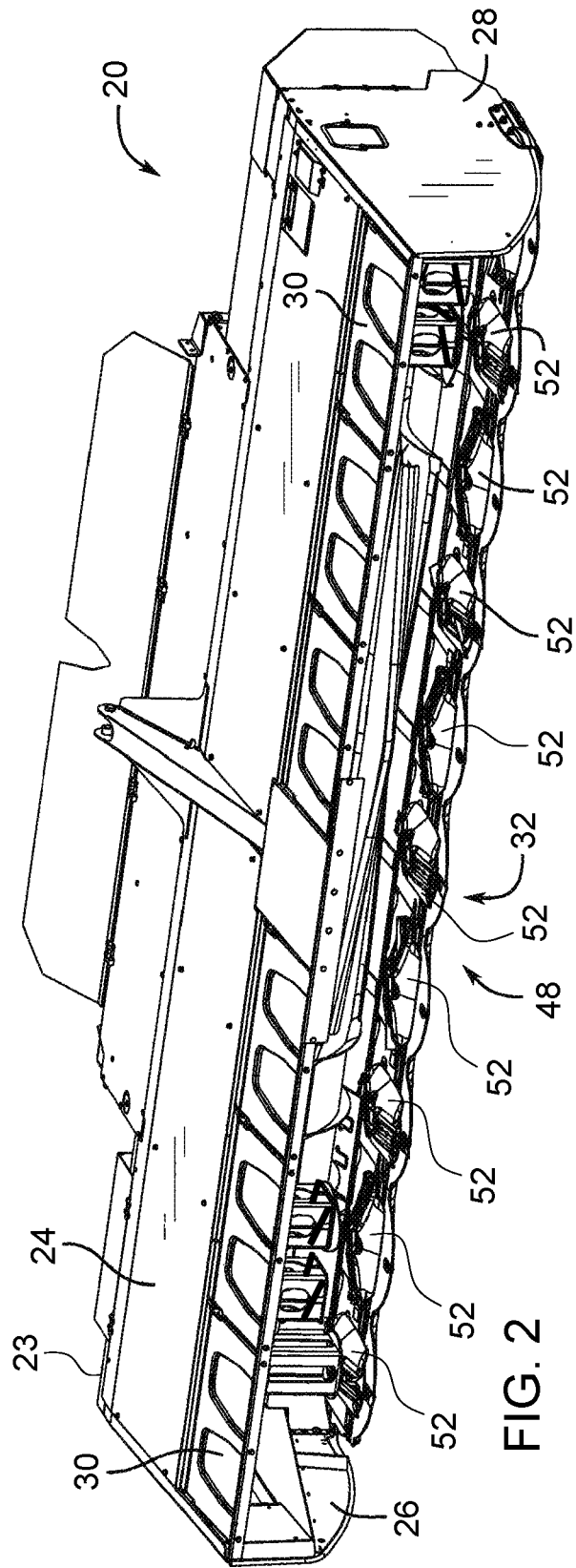

CROP MOWING IMPLEMENT AND A CONVERGING DRUM THEREFOR

FIELD OF THE DISCLOSURE

The present disclosure generally relates to a converging drum for a crop mowing implement.

BACKGROUND OF THE DISCLOSURE

The width of crop and forage mowing implements, such as mower-conditioners, self-propelled windrowers, and other similar machines, have been increasing to meet the capacity of modern balers and forage harvesters. These wider mowing implements move the mowed crop material laterally inward to feed a processing system, such as but not limited to conditioning systems. In order to help move the mowed crop material laterally inward toward the center of the implement, one or more converging drums may be positioned above outer ends of a cutter bar. The converging drums rotate about a vertical, central longitudinal axis and help direct the mowed crop laterally inward toward the center of the implement.

Additionally, some processing systems, such as but not limited to conditioning systems, process the mowed crop material through a narrow horizontal opening defined between two opposing rollers. Often, the mowed crop material must be moved vertically upward or downward toward the horizontal opening between the rollers.

SUMMARY OF THE DISCLOSURE

According to an aspect of the present disclosure a converging drum for a crop mowing implement is provided. The converging drum includes a body having an exterior surface. The body extends along a central longitudinal axis, between a first end and a second end. The body is configured to rotate about the central longitudinal axis in a defined rotational direction. The converging drum includes at least one ramp feature that is attached to and extends radially outward from the exterior surface of the body, relative to the central longitudinal axis. The ramp feature is disposed between the first end and the second end of the body. The ramp feature is arranged to form an acute angle relative to a reference plane, which is disposed orthogonal to the central longitudinal axis.

In one aspect of the disclosure, the acute angle formed between the ramp feature and the reference plane is open in a direction toward the defined rotational direction to present a descending ramp surface as the converging drum rotates in the defined rotational direction. The descending ramp is operable to direct crop material in a downward direction along the central longitudinal axis.

In one aspect of the disclosure, the acute angle formed between the ramp feature and the reference plane is open in a direction away from the defined rotational direction to present an ascending ramp surface as the converging drum rotates in the defined rotational direction. The ascending ramp surface is operable to direct crop material in an upward direction along the central longitudinal axis.

In one aspect of the disclosure, the at least one ramp feature includes a plurality of ramp features disposed angularly about the central longitudinal axis. The plurality of ramp features may include a first group of ramp features and/or a second group of ramp features.

In one aspect of the disclosure, each respective ramp feature of the first group of ramp features includes their respective acute angle of each ramp feature open toward the defined rotational direction to present a descending ramp surface. The descending ramp surface is operable to direct crop material in a downward direction along the central longitudinal axis. In one aspect of the disclosure, the first group of ramp features is disposed adjacent the second end of the body.

In one aspect of the disclosure, each respective ramp feature of the second group of ramp features includes their respective acute angle of each ramp feature open away from the defined rotational direction to present an ascending ramp surface. The ascending ramp surface is operable to direct crop material in an upward direction along the central longitudinal axis. In one aspect of the disclosure, the second group of ramp features is disposed adjacent the first end of the body.

In one aspect of the disclosure, the converging drum includes only the first group of ramp features. In another aspect of the disclosure, the converging drum includes only the second group of ramp features. In another aspect of the disclosure, the converging drum includes both the first group of ramp features and the second group of ramp features.

In one aspect of the disclosure, the body includes a planar wall portion extending parallel to the central longitudinal axis. The ramp feature includes a plate, which defines a circular segment having a thickness. The plate includes a straight inner edge disposed against the planar wall portion of the body, and extends outward away from the planar wall surface of the body to a curved distal edge.

In one aspect of the disclosure, the acute angle is equal to or less than eighty degrees, and equal to or greater than ten degrees. In another aspect of the disclosure, the acute angle is equal to or less than forty-five degrees, and equal to or greater than fifteen degrees.

In another aspect of the disclosure, A mowing implement for cutting a crop material is provided. The mowing implement includes a frame forming a work area including a forwardly located inlet zone and a rearwardly located discharge zone. A cutter bar is supported by the frame between the inlet zone and the discharge zone. The cutter bar extends along an axis disposed generally transverse to a direction of travel. The cutter bar includes a plurality of spaced apart knife-carrying rotary discs disposed in the work area for rotation about respective vertical axes. A crop conditioning system is attached to the frame. The crop conditioning system includes an upper conditioner roll and a lower conditioner roll, and is positioned to receive crop material therebetween from the cutter bar. The mowing implement includes at least one converging drum that is attached to one of the frame and the cutter bar. The mowing implement is operable to move crop material laterally along the axis of the cutter bar toward the discharge zone. The converging drum includes a body having an exterior surface. The body extends vertically along a central longitudinal axis, between a first end and a second end. The body is configured to rotate about the central longitudinal axis in a defined rotational direction. The converging drum further includes at least one ramp feature. The ramp feature is attached to and extends radially outward from the exterior surface of the body relative to the central longitudinal axis. The ramp feature is disposed between the first end and the second end of the body; and is arranged to form an acute angle relative to a reference plane. The reference plane is disposed orthogonal to the central longitudinal axis.

In one aspect of the mowing implement, the acute angle between the ramp feature and the reference plane is open toward the defined rotational direction to present a descending ramp surface. The descending ramp surface is operable to direct crop material in a downward direction along the central longitudinal axis.

In another aspect of the mowing implement, the acute angle between the ramp feature and the reference plane is open away from the defined rotational direction to present an ascending ramp surface. The ascending ramp surface is operable to direct crop material in an upward direction along the central longitudinal axis.

In one aspect of the mowing implement, the at least one ramp feature includes a first group of ramp features. Each of the first group of ramp features is disposed adjacent the second end of the body, and includes their respective acute angle open toward the defined rotational direction to present the descending ramp surface for directing crop material in the downward direction along the central longitudinal axis.

In one aspect of the mowing implement, the at least one ramp feature includes a second group of ramp features. Each of the second group of ramp features is disposed adjacent the first end of the body, and includes their respective acute angle open away from the defined rotational direction to present the ascending ramp surface for directing crop material in the upward direction along the central longitudinal axis.

In another aspect of the mowing implement, the at least one ramp feature includes both the first group of ramp features disposed at the second end of the body and configured for directing crop material in the downward direction along the central longitudinal axis, and the second group of ramp features disposed at the first end of the body and configured for directing crop material in the upward direction along the central longitudinal axis.

In another aspect of the mowing implement, the body includes a planar wall portion extending parallel to the central longitudinal axis. The ramp feature includes a plate having a straight inner edge disposed against the planar wall portion of the body. The plate extends outward away from the planar wall surface of the body to a curved distal edge surface. The plate defines a circular segment having a thickness.

The ramp feature(s) of the converging drum may be arranged to direct the cut crop material upward and/or downward to better position the crop material for processing, e.g., between the upper conditioner roll and the lower conditioner roll of the conditioning system.

The above features and other advantages will become apparent from the following description and accompanying drawings.

BRIEF DESCRIPTION OF THE DRAWINGS

The detailed description of the drawings refers to the accompanying figures.

FIG. 1 is a schematic rear perspective view of an agricultural vehicle pulling a mowing implement.

FIG. 2 is a schematic partial front perspective view of the mowing implement.

DETAILED DESCRIPTION OF THE DRAWINGS

Those having ordinary skill in the art will recognize that terms such as "above," "below," "upward," "downward," "top," "bottom," "left," "right," etc., are used descriptively for the figures, and do not represent limitations on the scope of the disclosure, as defined by the appended claims.

Referring to the Figures, wherein like numerals indicate corresponding parts throughout the several views, a mowing implement 20 is generally shown embodied as a mower-conditioner implement. FIG. 1 illustrates the mowing implement 20 being drawn by an agricultural vehicle 22. The mowing implement 20 may be pulled by the vehicle 22 to mow and/or condition crops or grasses, such as shown in FIG. 1. However, in other embodiments, the mowing implement 20 may be pushed by the agricultural vehicle 22 to mow and/or condition crops or grasses.

Figure 3:
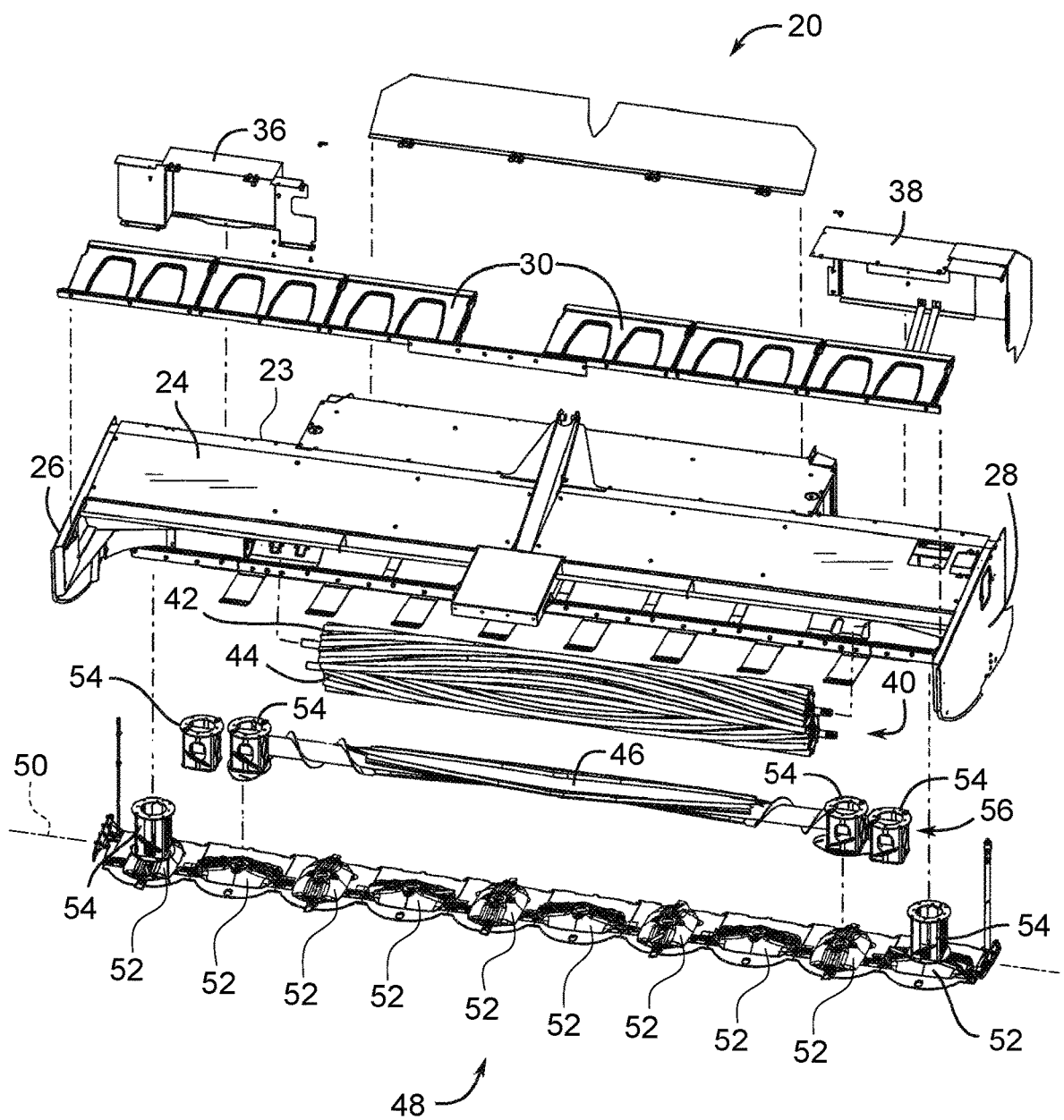
FIG. 3 is a schematic exploded perspective view of the mowing implement.

Referring to FIGS. 2-3, the mowing implement 20 includes a frame 23 forming a work area. The work area includes a forwardly located inlet zone 32, and a rearwardly located discharge zone 34. The frame 23 includes a top frame member 24 that extends between a right-side outer wall 26 and a left-side outer wall 28. A series of consecutive panels 30 also extend between the right-side outer wall 26 and the left-side outer wall 28, along a front edge of the top frame member 24. Together with the right-side outer wall 26 and the left-side outer wall 28, the panels 30 generally define the forwardly located material inlet zone 32 proximal to a front edge of the panels 30. A right-side transverse rear wall 36 and a left-side transverse rear wall 38 extend inwardly from the right-side outer wall 26 and the left-side outer wall 28, respectively.

The right-side transverse rear wall 36 and the left-side transverse rear wall 38 terminate approximately at the ends of a crop conditioning system 40. The crop conditioning system 40 is attached to the frame 23, and includes an upper conditioner roll 42 and a lower conditioner roll 44. The crop conditioning system 40 is positioned to receive crop material therebetween from a cutter bar 48, described in greater detail below.

The upper conditioner roll 42 and a lower conditioner roll 44, which generally define the width of the material discharge zone 34, are located centrally in the mowing implement 20. It is to be understood that the locations of the material inlet zone 32 and the material discharge zone 34 are not critical to the teachings of this disclosure, and that implements having material inlet zones 32 and material discharge zones 34 which are not centered relative to the implement would benefit from the teachings of the present disclosure. Moreover, various other types of crop conditioning systems may be used instead of or in addition to the crop conditioning system 40 shown in the Figures and described herein. Such other crop conditioning systems may include, but are not limited to, flail/impeller conditioners, and the like.

The top frame member 24, together with the right-side outer wall 26 and the left-side outer wall 28 generally define the work area between the top frame member 24 and the ground. Material such as crops or grasses can generally enter the work area via the material inlet zone 32, be processed within the work area, and be discharged via the rearwardly located material discharge zone 34. Within the work area, each of the upper and lower conditioner rolls 42, 44 and of the crop conditioning system 40 includes a central cylindrical drum to which is attached a plurality of axially extending ribs or flutes that mesh together for conditioning crop that passes between them. The mowing implement 20 includes a spring-loaded link assembly that yieldably resists upward movement of the upper conditioner roll 42 caused by crop passing between the upper and lower conditioner rolls 42, 44 and. The arrangement of gearing is such that the upper and lower conditioner rolls 42, 44 and are counter-rotated, i.e., rotate in opposite rotational directions, so as to draw crop in between them.

A rotatably mounted auger 46 extends between the right-side outer wall 26 and the left-side outer wall 28, and passes in front of the crop conditioning system 40. In particular, the auger 46 is positioned in front of the lower conditioner roll 44 with a central axis of the auger 46 laterally spaced apart from, and lower than a central axis of the lower conditioner roll 44. The auger 46 includes a central cylindrical drum with a central portion and outer ends. The outer ends of the auger 46 include flighting, and a plurality of fins is attached to the central portion. In operation, the design of the auger 46 enables the delivery of cut crop material into a nip or gap area of the crop conditioning system 40, with the auger 46 and lower conditioner roll 44 co-rotated in the same rotational direction, and with the auger 46 and the upper conditioner roll 42 counter-rotated in opposite rotational directions.

A cutter bar 48 is supported by the frame 23, between the inlet zone 32 and the discharge zone 34. The cutter bar 48 extends along an axis 50 that is disposed generally transverse to a direction of travel of the implement. The cutter bar 48 extends between the right-side outer wall 26 and the left-side outer wall 28, and is located just forward of the crop conditioning system 40. While the present disclosure could be advantageously applied to rotary cutter bars of various constructions, the cutter bar 48 of the exemplary embodiment is a known type containing a plurality of intermeshed spur gears including a plurality of idler gears meshed with each other and arranged in transverse alignment over the length of the cutter bar 48, with selected ones of the idler gears being meshed with drive gears respectively associated, one each, with a plurality of cutting discs 52 spaced along the cutter bar 48. For details of the gear housing and gearing of the cutter bar 48, reference may be had to U.S. Pat. No. 5,964,079, the entirety of which is incorporated by reference herein.

The cutter bar 48 includes a plurality of spaced apart knife-carrying rotary cutting discs 52 disposed in the work area for rotation about respective vertical axes. The cutting discs 52 are located forward of the crop conditioning system 40. Each of the cutting discs 52 is coupled to an upright drive shaft to which power is coupled for causing them to rotate in appropriate directions, for delivering cut crop material to the crop conditioning system 40.

The mowing implement 20 includes at least one converging drum 54 that is attached to one of the frame 23 and/or the cutter bar 48, and that is operable to move cut crop material laterally along the axis 50 of the cutter bar 48 toward the conditioning system 40 and the discharge zone 34. The mowing implement 20 may include one or more converging drums 54 on the either side of the auger 46. The converging drums 54 are provided for augmenting the rotating cutter discs in conveying cut crop into the discharge passage for further processing by the upper and lower conditioner rolls 42, 44 and. Each of the converging drums 54 rotates in a pre-defined rotational direction. The pre-defined rotational direction for each converging drum 54 may include either a clockwise direction or a counterclockwise direction. In the exemplary embodiment shown and described herein, each of the converging drums 54 are mounted for rotation about a respective generally upright axis. However, in other embodiments, one or more of the converging drums 54 may be mounted at varying angles relative to vertical. In addition, the direction of rotation can be varied to suitably converge material for a given arrangement. In one example, for a multiple converging drum 54 arrangement, each of the converging drums 54 can be independently rotated in either a clockwise or counterclockwise direction so as to feed the cut crop material into the crop conditioning system 40. The speed of rotation can also be varied such that, for example, a laterally inner converging drum 54 may rotate at a first speed (e.g., rpm), while a laterally outer converging drum 54 may rotate a second speed different from the first speed.

Figure 4:
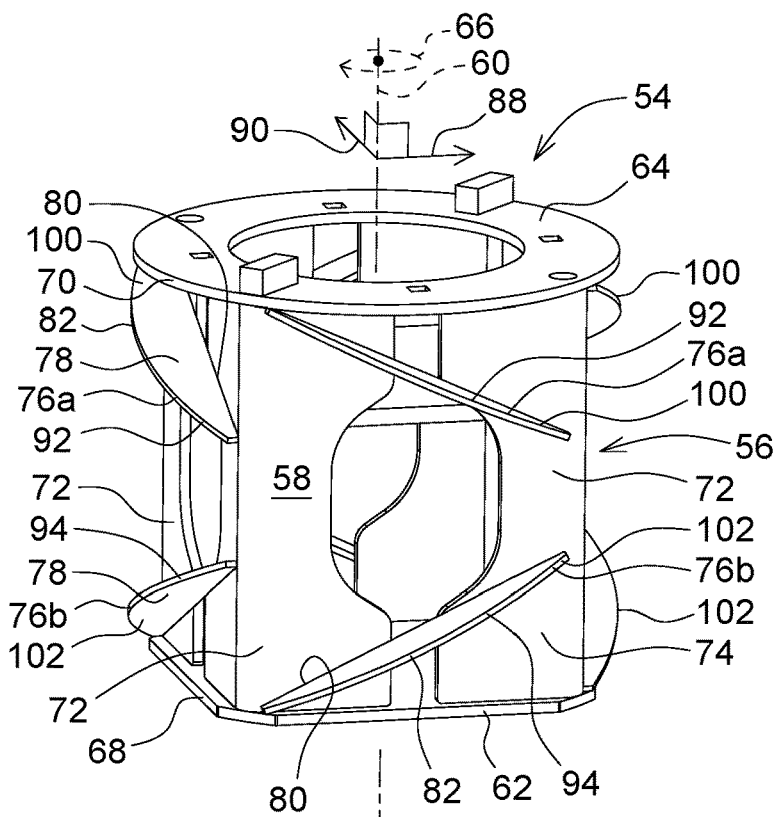
FIG. 4 is a schematic perspective view of a converging drum of the mowing implement.
Figure 5:
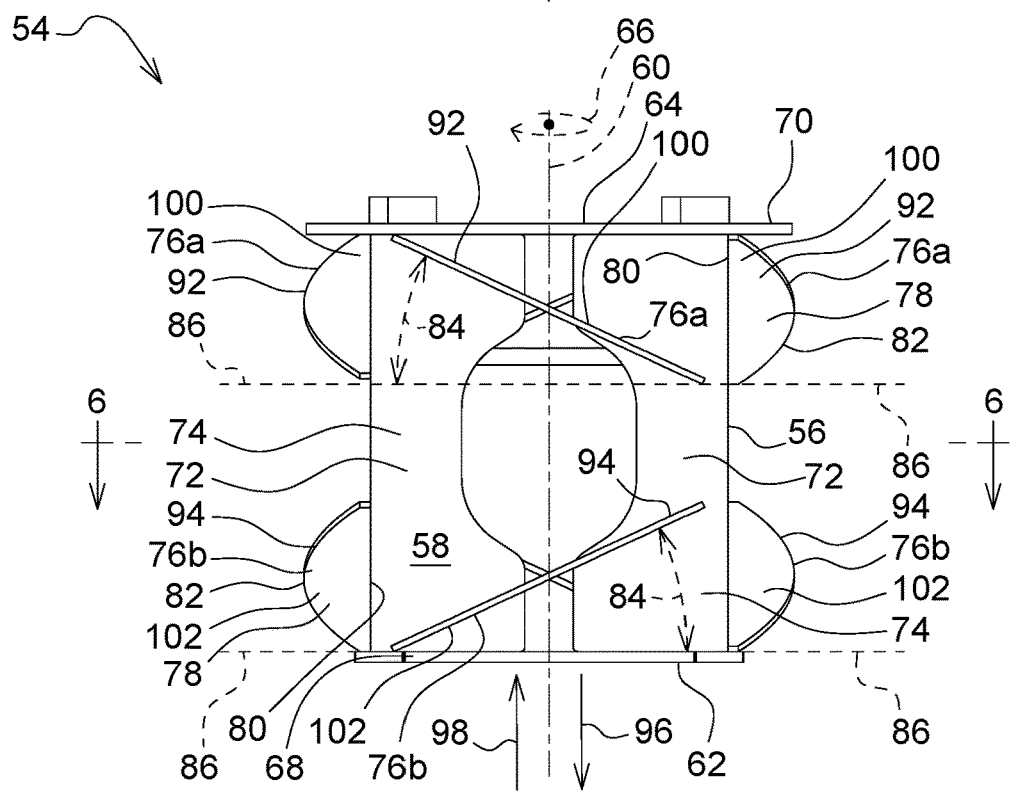
FIG. 5 is a schematic side view of the converging drum shown in FIG. 4.
Figure 6:
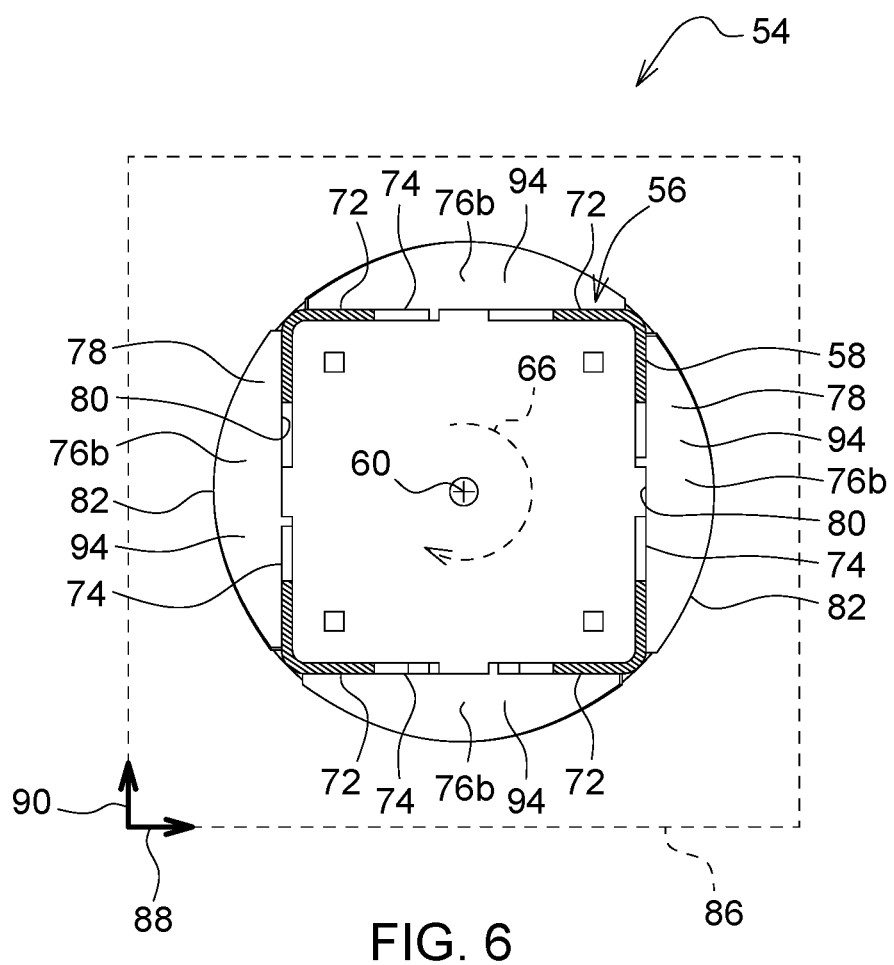
FIG. 6 is a schematic cross-sectional view of the converging drum perpendicular to a central longitudinal axis and along cut line 6-6 shown in FIG. 5.

Referring to FIGS. 4-6, an exemplary embodiment of the converging drum 54 is generally shown and described herein. The specific design of each converging drum 54 is dependent upon the direction of rotation of that converging drum 54, and the vertical direction that converging drum 54 is designed to move the cut crop material. The detailed description provides an exemplary embodiment of the converging drum 54. However, it should be appreciated, based on the teachings of this disclosure below, that each converging drum 54 may include its own specific configuration based on its location on the mowing implement 20, location relative to other converging drums 54, a direction of desired crop movement, etc. Furthermore, the shape, construction, etc. of the converging drums 54 may differ from the exemplary embodiment shown in the Figures and described herein.

Referring to FIGS. 4-6, the converging drum 54 includes a body 56. The body 56 includes an exterior surface 58, and extends along a central longitudinal axis 60 between a first end 62 and a second end 64. As shown in the Exemplary embodiment, the central longitudinal axis 60 is generally vertical. However, it should be appreciated that the central longitudinal axis 60 is not required to be vertical. In other words, the body 56 may be angled to some degree relative to vertical. The body 56 is configured to rotate about the central longitudinal axis 60 in a defined rotational direction. As noted above, the defined rotational direction may be either a clockwise rotational direction, or a counterclockwise rotational direction. As shown in FIGS. 4-6, the defined rotational direction is a clockwise rotational direction indicated by arrow 66.

The converging drum 54 includes a first end plate 68 defining the first end 62 of the body 56, and a second end plate 70 defining the second end 64 of the body 56. The first end plate 68 and the second end plate 70 are spaced apart from each other along the central longitudinal axis 60. In some embodiments, the first end plate 68 may be fixed for rotation with a respective cutting disc 52. In other embodiments, the first end plate 68 is not attached to a respective cutting disc 52, and may be suspended above the cutting discs 52 with a vertical gap therebetween to allow the cutter bar 48 to flex vertically.

In the exemplary embodiment of the converging drum 54 shown and described herein, the body 56 further includes four vertical angle members 72 extending between and interconnecting the first end plate 68 and the second end plate 70. The angle members 72 extend along and parallel with the central longitudinal axis 60, and are each located such that their respective corners are disposed at or near the peripheries of the first end plate 68 and the second end plate 70, and cooperate to form a rectangular cross section perpendicular to the central longitudinal axis 60. In the exemplary embodiment shown and described herein, the rectangular cross section is a square cross section. It should be appreciated that the body 56 of the converging drum 54 may be configured differently than described herein, and may include a cross sectional shape perpendicular to the central longitudinal axis 60 that is not rectangular, such as but not limited to a triangular shape, a pentagon, a circular shape, an oval shape, etc.

The exemplary embodiment of the converging drum 54 shown in the Figures and described herein includes the body 56 having at least one planar wall portion 74 that extends parallel to the central longitudinal axis 60. As shown in the exemplary embodiment, the body 56 includes four planar wall portions 74, i.e., one planar wall portion 74 for each side of the rectangular cross-sectional shape of the body 56. It should be appreciated that other embodiments may include a different number of planar wall portions 74. In yet other embodiments, the body 56 may define a circular or oval cross-sectional shape, such that the body 56 does not include any planar wall portions.

The converging drum 54 includes at least one ramp feature 76 that is attached to and extends radially outward from the exterior surface 58 of the body 56, relative to the central longitudinal axis 60. The ramp feature 76 is disposed between the first end 62 and the second end 64 of the body 56. In the exemplary embodiment, the at least one ramp feature 76 includes a plurality of ramp features 76, with at least one ramp feature 76 disposed on each planar wall portion 74 of the body 56.

The ramp feature 76 of the exemplary embodiment shown in the Figures and described herein includes a plate 78 that defines a circular segment having a thickness. As such, the exemplary embodiment of the ramp feature 76 includes a straight inner edge surface 80 disposed against the planar wall portion 74 of the body 56. The plate 78 extends outward away from the planar wall surface of the body 56 to a curved distal edge surface 82. It should be appreciated that the ramp feature 76 may be shaped and/or configured differently than the exemplary embodiment shown in the Figures and described herein. For example, if the body 56 includes a circular cross-sectional shape perpendicular to the central longitudinal axis 60, then the inner edge surface 80 of the plate 78 would exhibit a curved or circular shape. Additionally, the distal edge surface may differ from the curved distal edge surface 82 shown in the Figures and described herein. For example, the distal edge surface may include a rectangular or polygonal exterior shape.

As best shown in FIG. 5, the ramp feature 76 is arranged to form an acute angle 84 relative to a reference plane 86. The reference plane 86 is disposed orthogonal to the central longitudinal axis 60. As best shown in FIG. 6, it should be appreciated that the reference plane 86 is defined by two axes, e.g., an x-axis 88 and a y-axis 90. Each of the x-axis 88 and the y-axis 90 is perpendicular to the central longitudinal axis 60 such that the central longitudinal axis 60 is perpendicular to the reference plane 86 in all radial directions about the central longitudinal axis 60.

In the exemplary embodiment shown in the Figures and described herein, the acute angle 84 is equal to or less than eighty degrees (80°), and equal to or greater than ten degrees (10°). More preferably, the acute angle 84 is equal to or less than forty-five degrees (45°), and equal to or greater than fifteen degrees (15°).

As best shown in FIG. 5, the acute angle 84 may be open toward the defined rotational direction, such as shown by ramp feature 76A, or may open away from the defined rotational direction, such as shown by ramp feature 76B. The acute angle 84 is open toward the defined rotational direction, i.e., in the same direction as the defined rotational direction, to present a descending ramp surface to create a descending ramp 92 that is operable to direct crop material in a downward vertical direction along the central longitudinal axis 60. The downward vertical direction is generally indicated by arrow 96. The acute angle 84 is open away from the defined rotational direction, i.e., in a direction opposite to the defined rotational direction, to present an ascending ramp surface to create an ascending ramp 94 that is operable to direct crop material in an upward direction along the central longitudinal axis 60. The upward vertical direction is generally indicated by arrow 98.

As noted above, the at least one ramp feature 76 includes a plurality of ramp features 76 disposed angularly about the central longitudinal axis 60. The plurality of ramp features 76 may include a first group 100 of ramp features 76 and/or a second group 102 of ramp features 76.

Each of the first group 100 of ramp features 76 is disposed on a respective wall portion 74 of the body 56 of the converging drum 54. Each of the first group 100 of ramp features 76 includes the respective acute angle 84 of each ramp feature 76 open toward the defined rotational direction to present the descending ramp 92 operable to direct crop material in the downward direction along the central longitudinal axis 60. The first group 100 of ramp features 76 is disposed adjacent the second end 64 of the body 56.

Each of the second group 102 of ramp features 76 is disposed on a respective wall portion 74 of the body 56 of the converging drum 54. Each of the second group 102 of ramp features 76 includes the respective acute angle 84 of each ramp feature 76 open away from the defined rotational direction to present the ascending ramp 94 operable to direct crop material in the upward direction along the central longitudinal axis 60. The second group 102 of ramp features 76 is disposed adjacent the first end 62 of the body 56.

Figure 7:
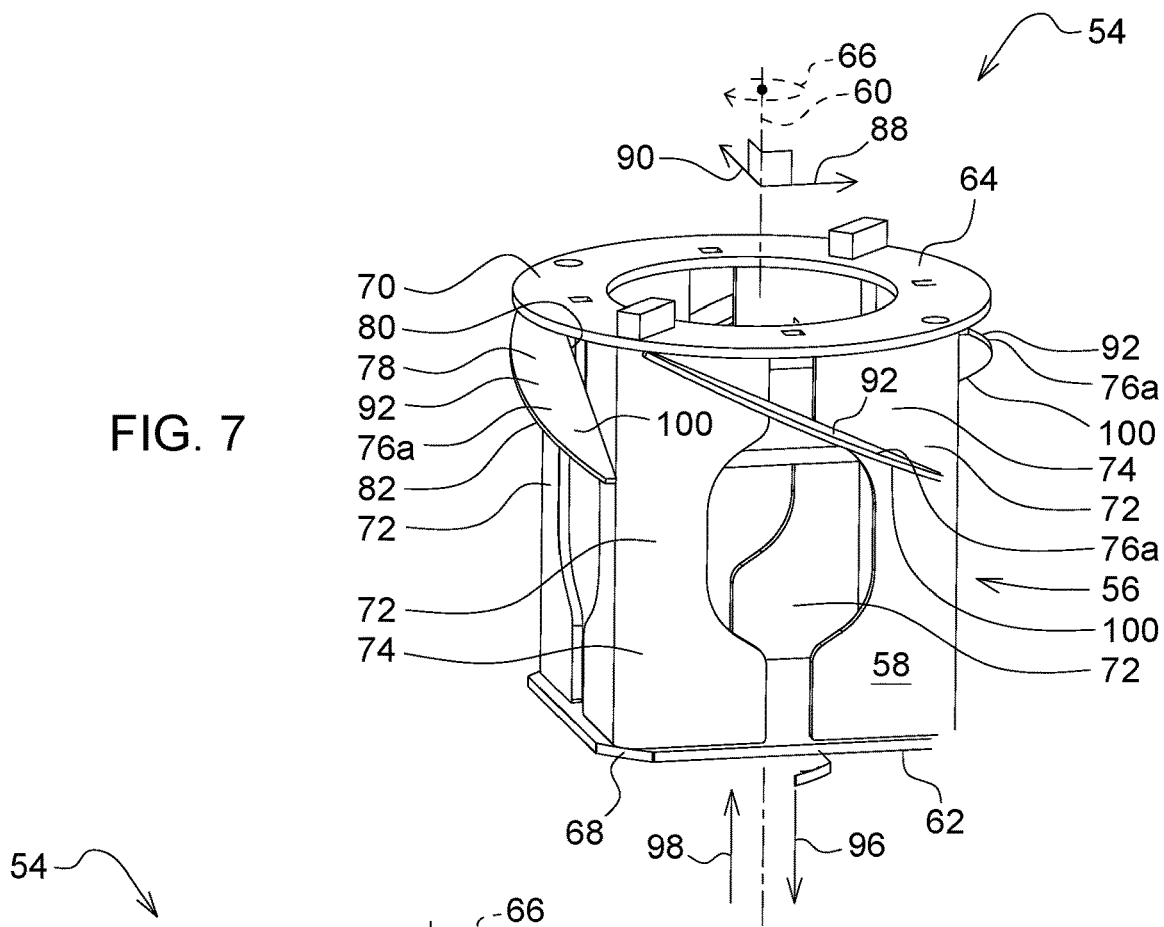
FIG. 7 is a schematic perspective view of a first alternative embodiment of the converging drum.
Figure 8:
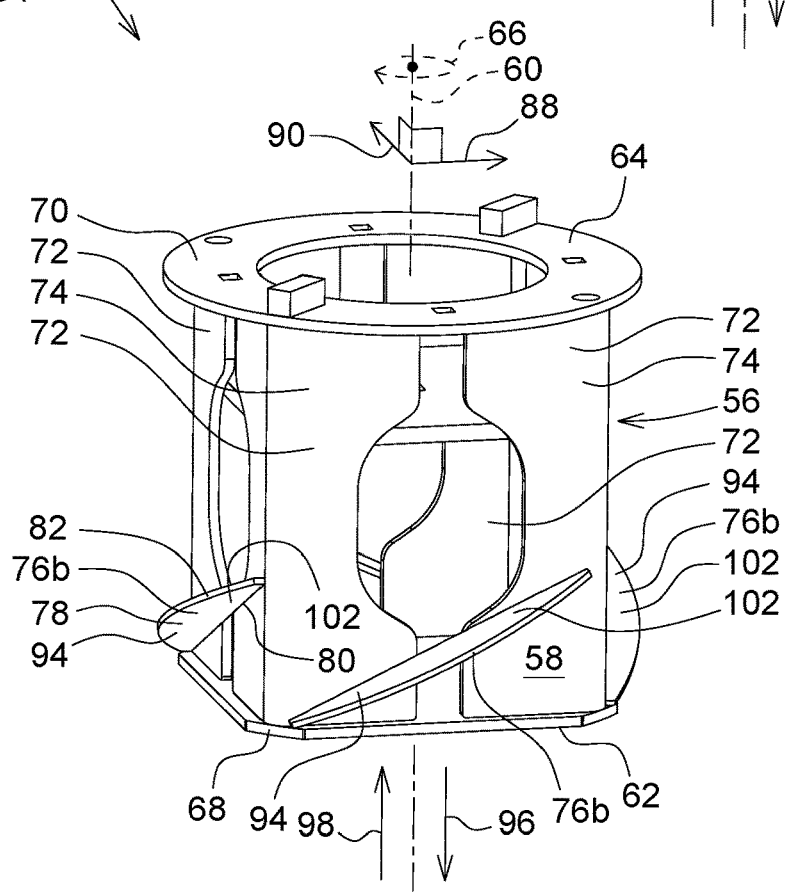
FIG. 8 is a schematic perspective view of a second alternative embodiment of the converging drum.

The exemplary embodiment of the converging drum 54 shown in FIGS. 4-6 includes both the first group 100 of ramp features 76 and the second group 102 of ramp features 76. However, it should be appreciated that other embodiments of the converging drum 54 may include only the first group 100 of ramp features 76, such as shown in FIG. 7, or only the second group 102 of ramp features 76, such as shown in FIG. 8.

Referring to FIG. 5, each of the ramp features 76 extends a length along the central longitudinal axis 60. The ramp features 76 may extend from the first end 62 of the body 56 to the second end 64 of the body 56. In other embodiments, the ramp features 76 only extend partially between the first end 62 and the second end 64 of the body 56. Additionally, the ramp features 76 may be disposed adjacent the first end 62 or the second end 64. In other embodiments, however, the ramp features 76 may be centrally located along the central longitudinal axis 60, between the first end 62 and the second end 64 of the body 56, such that the ramp features 76 are spaced generally equidistant from both the second end 64 and the first end 62 of the body 56.

The particular configurations of the other embodiments of the converging drums 54 will depend on the particular location of the converging drum 54 on the mowing implement 20, the rotational direction of the converging drum 54, and a desired elevation control for the mowed crop material. The ramp features 76 on the converging drum 54 are configured to increase the elevation of the mowed crop material, or decrease the elevation of the mowed crop material, as needed, to better feed the crop material into the conditioning system 40, between the upper conditioner roll 42 and the lower conditioner roll 44. Accordingly, the placement, number, and configuration of the ramp features 76 is dependent upon the specific crop movement desired for a particular location on the mowing implement 20.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A converging drum for a crop mowing implement, the converging drum comprising:
   a body having an exterior surface and extending along a central longitudinal axis between a first end and a second end, wherein the body is configured to rotate about the central longitudinal axis in a defined rotational direction;
   at least one ramp feature attached to and extending radially outward from the exterior surface of the body relative to the central longitudinal axis, and disposed between the first end and the second end of the body;
   wherein the at least one ramp feature is arranged to form an acute angle relative to a reference plane disposed orthogonal to the central longitudinal axis;
   wherein the at least one ramp feature includes a plurality of ramp features disposed angularly about the central longitudinal axis; and
   wherein the plurality of ramp features includes a first group of ramp features, with each of the first group of ramp features including the respective acute angle of each ramp feature open toward the defined rotational direction to present a descending ramp operable to direct crop material in a downward direction along the central longitudinal axis.

2. The converging drum set forth in claim 1, wherein the first group of ramp features is disposed adjacent the second end of the body, with the second end of the body positioned vertically above the first end of the body along the central longitudinal axis.

3. The converging drum set forth in claim 1, wherein the plurality of ramp features includes a second group of ramp features.

4. The converging drum set forth in claim 3, wherein each of the second group of ramp features includes the respective acute angle of each ramp feature open away from the defined rotational direction to present an ascending ramp operable to direct crop material in an upward direction along the central longitudinal axis.

5. The converging drum set forth in claim 4, wherein the second group of ramp features is disposed adjacent the first end of the body, with the second end of the body positioned vertically above the first end of the body along the central longitudinal axis, such that the second group of ramp features is positioned vertically below the first group of ramp features.

6. The converging drum set forth in claim 1, wherein the body includes a tubular rectangular shape defining a rectangular cross section perpendicular to the central longitudinal axis, with the body presenting a planar wall portion extending parallel to the central longitudinal axis.

7. The converging drum set forth in claim 6, wherein the at least one ramp feature includes a plate having a straight inner edge disposed against the planar wall portion of the body, and wherein the plate extends outward away from the planar wall surface of the body to a curved distal edge.

8. The converging drum set forth in claim 7, wherein the plate of the at least one ramp feature defines a circular segment having a thickness.

9. The converging drum set forth in claim 1, wherein the acute angle is equal to or less than eighty degrees, and equal to or greater than ten degrees.

10. A converging drum for a crop mowing implement, the converging drum comprising:
    a body having an exterior surface and extending along a central longitudinal axis between a first end and a second end, wherein the body is configured to rotate about the central longitudinal axis in a defined rotational direction;
    at least one ramp feature attached to and extending radially outward from the exterior surface of the body relative to the central longitudinal axis, and disposed between the first end and the second end of the body;
    wherein the at least one ramp feature is arranged to form an acute angle relative to a reference plane disposed orthogonal to the central longitudinal axis; and
    wherein the acute angle is open toward the defined rotational direction to present a descending ramp operable to direct crop material in a downward direction along the central longitudinal axis.

11. A mowing implement for cutting a crop material, the mowing implement comprising:
    a frame forming a work area including a forwardly located inlet zone and a rearwardly located discharge zone;
    a cutter bar supported by the frame between the inlet zone and the discharge zone, and extending along an axis disposed generally transverse to a direction of travel, the cutter bar including a plurality of spaced apart knife-carrying rotary discs disposed in the work area for rotation about respective vertical axes;
    a crop conditioning system attached to the frame and having an upper conditioner roll and a lower conditioner roll, and positioned to receive crop material therebetween from the cutter bar;
    at least one converging drum attached to one of the frame and the cutter bar, and operable to move crop material laterally along the axis of the cutter bar toward the discharge zone, the at least one converging drum including:
    a body having an exterior surface and extending vertically along a central longitudinal axis between a first end and a second end, wherein the body is configured to rotate about the central longitudinal axis in a defined rotational direction, and with the second end of the body positioned vertically above the first end of the body along the central longitudinal axis;
    at least one ramp feature attached to and extending radially outward from the exterior surface of the body relative to the central longitudinal axis, and disposed between the first end and the second end of the body;
    wherein the at least one ramp feature is arranged to form an acute angle relative to a reference plane disposed orthogonal to the central longitudinal axis;
    the at least one ramp feature includes a first group of ramp features and a second group of ramp features;
    wherein each of the first group of ramp features is disposed adjacent the second end of the body and vertically above each of the second group of ramp features along the central longitudinal axis; and wherein each of the first group of ramp features includes the respective acute angle of each ramp feature of the first group of ramp features open toward the defined rotational direction to present a descending ramp operable to direct crop material in a downward direction along the central longitudinal axis.

12. The mowing implement set forth in claim 11, wherein:
the second group of ramp features is disposed adjacent the first end of the body and vertically below each of the first group of ramp features along the central longitudinal axis, and wherein the second group of ramp features includes the respective acute angle of each ramp feature of the second group of ramp features open away from the defined rotational direction to present an ascending ramp operable to direct crop material in an upward direction along the central longitudinal axis.

13. The mowing implement set forth in claim 11, wherein:
the body includes a tubular rectangular shape defining a rectangular cross section perpendicular to the central longitudinal axis, with the body presenting a planar wall portion extending parallel to the central longitudinal axis;
the at least one ramp feature includes a plate having a straight inner edge disposed against the planar wall portion of the body, and wherein the plate extends outward away from the planar wall surface of the body to a curved distal edge; and the plate of the at least one ramp feature defines a circular segment having a thickness.

\* \* \* \* \*